US010656886B2

(12) United States Patent
Sun et al.

(10) Patent No.: US 10,656,886 B2
(45) Date of Patent: May 19, 2020

(54) SERVER, IMAGE FORMING SYSTEM AND ERROR NOTIFICATION METHOD FOR PERFOMING AUTHENTICATION PERMISSION OF USERS USING IMAGE FORMING APPARATUSES

(71) Applicant: KYOCERA Document Solutions Inc., Osaka (JP)

(72) Inventors: Zhenyu Sun, Osaka (JP); Masafumi Sato, Osaka (JP); Tatsuya Hiwatari, Osaka (JP); Keiji Tsuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/264,213

(22) Filed: Jan. 31, 2019

(65) Prior Publication Data
US 2019/0235806 A1    Aug. 1, 2019

(30) Foreign Application Priority Data

Jan. 31, 2018    (JP) ................................. 2018-014623

(51) Int. Cl.
| G06F 15/00 | (2006.01) |
| G06K 15/00 | (2006.01) |
| G06K 1/00 | (2006.01) |
| G06F 3/12 | (2006.01) |

(52) U.S. Cl.
CPC .......... G06F 3/1222 (2013.01); G06F 3/1238 (2013.01); G06F 3/1288 (2013.01)

(58) Field of Classification Search
CPC .... G06F 3/1222; G06F 3/1238; G06F 3/1288; G06F 3/1223; G06F 3/124
USPC ............................. 358/1.15, 1.14, 1.13, 1.1
See application file for complete search history.

(56) References Cited

U.S. PATENT DOCUMENTS

| 10,068,215 B1* | 9/2018 | Rosenthal | G06Q 20/204 |
| 10,581,781 B1* | 3/2020 | Newstadt | H04L 51/14 |

FOREIGN PATENT DOCUMENTS

JP    2005-020184 A    1/2005

* cited by examiner

*Primary Examiner* — Douglas Q Tran
(74) *Attorney, Agent, or Firm* — Hawaii Patent Services; Nathaniel K. Fedde; Kenton N. Fedde

(57) ABSTRACT

Provided is a server that is capable of directly sending a notification of an error to a non-registered user who is not authenticated and permitted to use an image forming apparatus. An authenticating unit performs authentication permission according to authentication information of a user. A notification-event-setting unit sets to send a notification of a server error as a recognizable event to a non-registered user, who is not registered to perform authentication permission by the authenticating unit. An event-notifying unit notifies about the event set by the notification-event-setting unit when the error actually occurs.

3 Claims, 7 Drawing Sheets

FIG. 6

| LEVEL | DATE AND TIME | SOURCE |
|---|---|---|
| INFORMATION | 2017/08/21 14:51:52 | KNM |

EVENT 0, KNM

● DISPLAY (N)    ○ XML DISPLAY (X)

- System
  - Provider
    [ Name ]    KNM
  - EventID    0
    [ Qualifiers ]    0
    Level    4
    Task    0
    Keywords    0x80000000000000
  - TimeCreated
    [ SystemTime ] 2017-08-21T05:51:52.0000000000Z
  EventRecordID    16907
  Channel    Application
  Computer    suca0127knm-2
  Security
- EventData TIME: 08/21/2017 2:51:49 PM SUBSYSTEM: CLI CONTEXT: Email sender TYPE: Info MESSAGE: Sending 1 email(s) waiting in the e-mail queue FILE: EmailQueue.php (177)

SERVER, IMAGE FORMING SYSTEM AND ERROR NOTIFICATION METHOD FOR PERFOMING AUTHENTICATION PERMISSION OF USERS USING IMAGE FORMING APPARATUSES

INCORPORATION BY REFERENCE

This application is based on and claims the benefit of priority from Japanese Patent Application No. 2018-014623 filed on Jan. 31, 2018, the contents of which are hereby incorporated by reference.

BACKGROUND

The present disclosure relates to a server, an image forming system, and an error notification method, and more particularly, to a server, an image forming system, and an error notification method that perform authentication permission of a user using an image forming apparatus.

Conventionally, there are image forming apparatuses such as a multi-function peripheral (MFP) or the like capable of printing documents and images.

There is also an image forming system including a plurality of image forming apparatuses and a server that performs output authentication permission for users that use the image forming apparatuses.

On the other hand, in a typical technique, there is an imaging apparatus. The imaging apparatus includes an imaging unit, a communicating unit, and a transmitting unit. The imaging unit captures an image. The communicating unit transmits the image captured by the imaging unit to a first external apparatus on a network and receives control information from the first external apparatus. The transmitting unit collects at least log information related to capturing by the imaging unit and transmits the log information spontaneously to a second external apparatus via the communicating unit.

SUMMARY

The server according to the present disclosure is a server for performing authentication permission of a user that uses an image forming apparatus. The server includes a notification-event-setting unit and an event-notifying unit. The notification-event-setting unit sets to send a notification of a server error as a recognizable event to a non-registered user, who is not registered to perform the authentication permission. The event-notifying unit notifies about the event set by the notification-event-setting unit when the error actually occurs.

The image forming system according to the present disclosure is an image forming system that includes an image forming apparatus and a server that performs authentication permission of a user who uses the image forming apparatus. The image forming apparatus includes an authentication-transmitting unit. The authentication-transmitting unit transmits authentication information of the user to the server. The server includes an authenticating unit, a notification-event-setting unit, and an event-notifying unit. The authenticating unit performs the authentication permission according to the authentication information of the user. The notification-event-setting unit sets to send a notification of a server error as a recognizable event to a non-registered user, who is not registered to perform the authentication permission by the authenticating unit. The event-notifying unit notifies about the event set by the notification-event-setting unit when the error actually occurs.

The error notification method according to the present disclosure is an error notification method that is executed by a server that performs authentication permission of a user who uses an image forming apparatus. The method sets to send a notification of a server error as a recognizable event to a non-registered user, who is not registered to perform the authentication permission. The method notifies about the set event when the error actually occurs.

BRIEF DESCRIPTION OF THE DRAWINGS

FIG. 6 is a conceptual diagram illustrating an example of an event in an embodiment according to the present disclosure.

DETAILED DESCRIPTION

Embodiment

[System Configuration of Image Forming System X]

Figure 1:
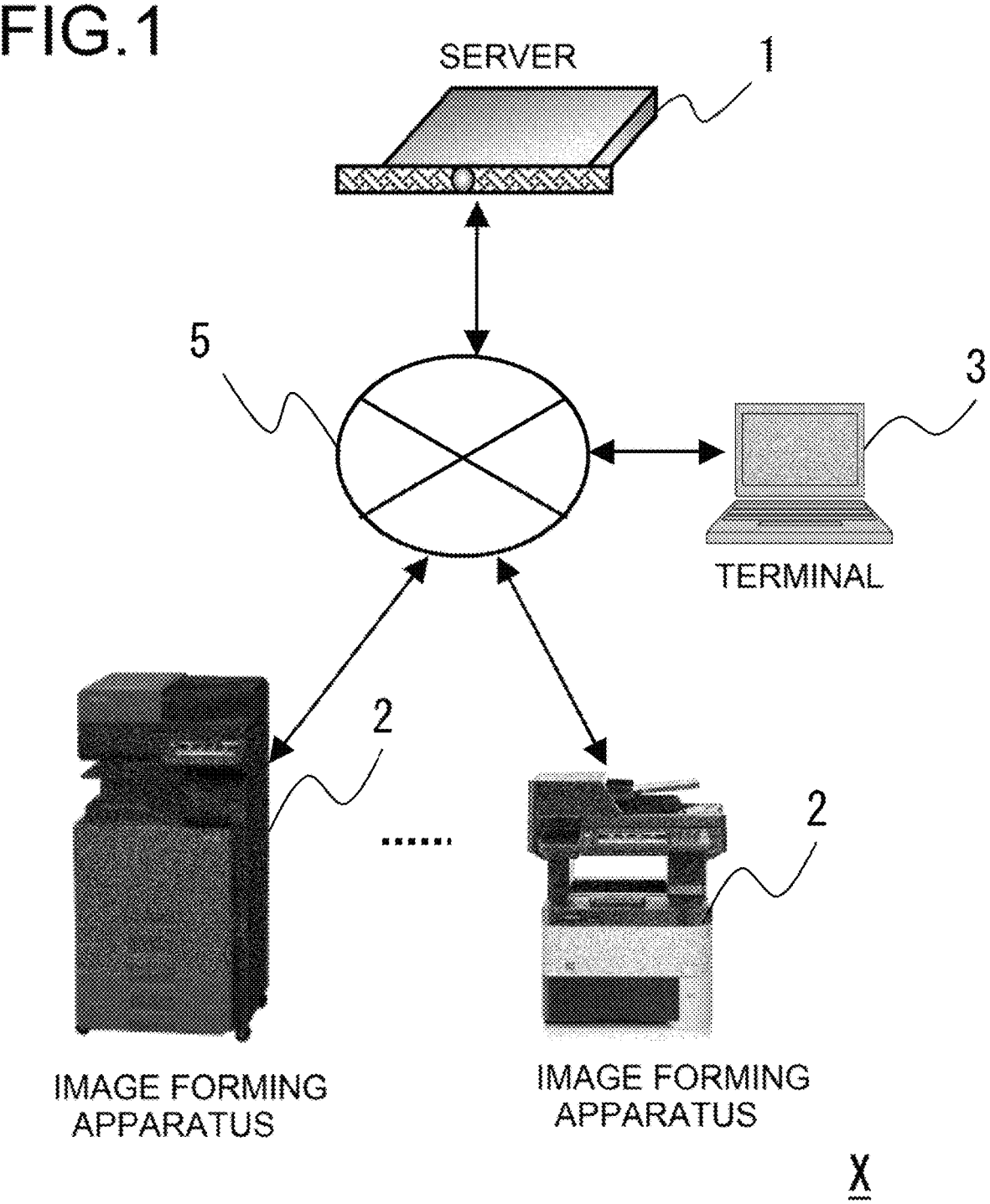
FIG. 1 is a system configuration diagram of an image forming system of an embodiment according to the present disclosure.

First, the system configuration of the image forming system X of an embodiment according to the present disclosure will be described with reference to FIG. 1.

The image forming system X is configured by connecting via a network 5 a server 1 that performs authentication permission, a plurality of image forming apparatuses 2 installed in a customer environment, and a terminal 3 of an unregistered person.

The server 1 is an information processing apparatus such as a PC (Personal Computer) or a general-purpose machine or the like. The server 1, manages authentication permission of users that use the plurality of image forming apparatuses 2, performs billing, maintenance, service correspondence, and the like. In other words, the server 1 may be a server that executes "pull printing" and the like on an Intranet network, and manages jobs such as printing and the like. Therefore, the server 1 executes an authentication permission program for executing authentication permission using a general-purpose server OS (Operating System). Hereinafter, in this embodiment, an example will be described in which the server OS is a Windows (registered trademark) server type OS manufactured by Microsoft Corporation.

Moreover, the server 1 may execute image processing, OCR (Optical Character Recognition) processing, classification processing, transmission processing to an e-mail or shared folder (document box, storage folder), to a DMS (Document Management System) for business or office, and the like.

The image forming apparatus 2 is a document apparatus such as an MFP, a network scanner, a document scanner, a network FAX, a printer with a scanner function, a single function printer, or the like. In addition, the image forming apparatus 2 may be capable of executing a client application for authentication permission and an application for maintenance management.

Moreover, the image forming apparatus 2 may have various functions such as printing, copying (copy), electronic documentation by scanning, network scanning, facsimile transmission/reception, network facsimile transmission/reception, a document box for storing electronic documents, and the like. Furthermore, for each function, settings such as black and white, monochrome color, full color, and the like may be possible.

In addition, in the case of an MFP or a printer having a printing function, the image forming apparatus 2 includes a photosensitive drum, an exposing unit, a developing unit, a transferring unit, a fixing unit, and the like. As a result, the image forming apparatus 2 is capable of recording and printing a toner image on recording paper by executing an image forming process that includes charging, exposing, developing, transferring, and fixing.

Moreover, the image forming apparatus 2 includes an operation panel unit for user authentication. Furthermore, the image forming apparatus 2 may be connected with a card reader for reading an ID card, a biometric authentication device, and the like. In addition, the image forming apparatus 2 may be connected to a device or the like (hereinafter referred to as "accounting device or the like") that bills a card by a coin vendor, a reader of various kinds of electronic money or a credit card, NFC (Near Field Communication), and the like.

The terminal 3 is a terminal such as a PC, a smartphone, a PDA (Personal Data Assistant), a cellular phone or the like used by a non-registered user. In the terminal 3, various general-purpose OSs operate. In addition, the terminal 3 can receive messages from e-mails, various messengers, Short Message Service (SMS), voicemail, and the like (hereinafter referred to as "e-mail, and the like").

The network 5 is an Intranet such as an LAN (Local Area Network) or the like, a network such as a WAN (Wide Area Network) or the like, such as the Internet or a mobile phone network, or the like.

The server 1 and each image forming apparatus 2 may be connected to the network 5 via a router, a gateway, or the like. Moreover, the network 5 may constitute a VPN (Virtual Private Network).

Figure 2:
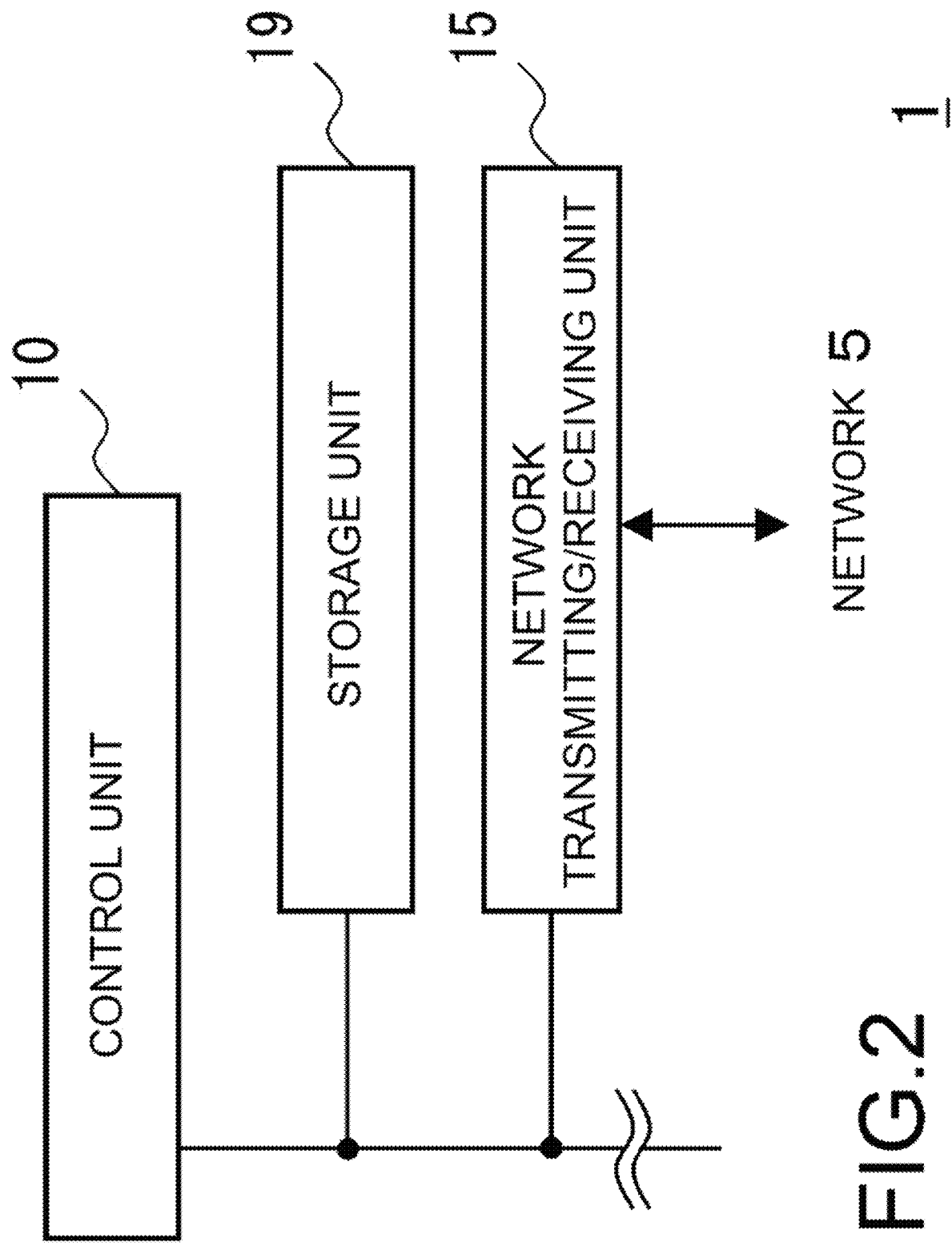
FIG. 2 is a block diagram illustrating the system configuration of the server illustrated in FIG. 1.

Next, the configuration of the server 1 will be described with reference to FIG. 2.

The server 1 includes a control unit 10, a network transmitting/receiving unit 15, and a storage unit 19.

The control unit 10 is an information-processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit) or the like.

The control unit 10 reads a control program stored in a ROM, a SSD, or a HDD of the storage unit 19, develops the control program in a RAM, and executes the control program to operate as a functional unit to be described later. In this embodiment, the control program includes a server OS and an authentication permission program.

The network transmitting/receiving unit 15 is a network connection unit that includes a LAN board, a wireless transceiver, and the like for connecting to the network 5.

The storage unit 19 is a storage unit that uses a non-transitory recording medium. The storage unit 19 may include a RAM (Random Access Memory) or the like as a main storage unit. In addition, as an auxiliary storage unit, the storage unit 19 may include a flash memory such as ROM (Read Only Memory), eMMC (embedded Multi Media Card), SSD (Solid State Drive), and the like, and/or a HDD (Hard Disk Drive) or the like. In this case, a control program for performing operational control of the server 1 may be stored in the auxiliary storage unit of the storage unit 19.

Incidentally, the control unit 10 may be internally equipped with a RAM, a ROM, a flash memory, or the like.

[Control Configuration of Image Forming System X]

Figure 3:
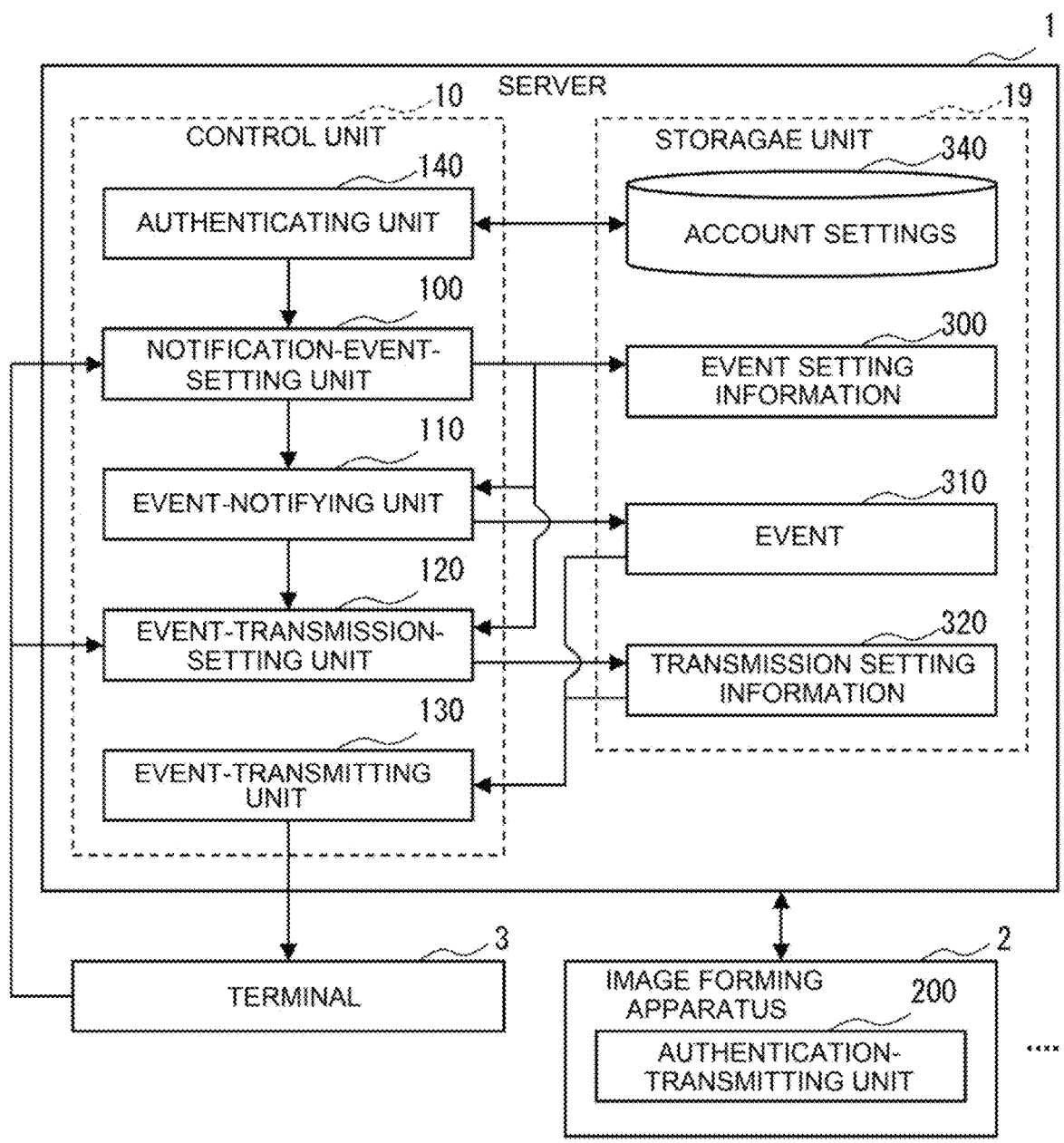
FIG. 3 is a block diagram illustrating the functional configuration of the image forming system of an embodiment according to the present disclosure.

Here, a control configuration of the image forming system X will be described with reference to FIG. 3.

The control unit 10 of the server 1 includes a notification-event-setting unit 100, an event-notifying unit 110, an event-transmission-setting unit 120, an event-transmitting unit 130, and an authenticating unit 140.

The storage unit 19 of the server 1 stores event setting information 300, an event 310, transmission setting information 320, and account settings 340.

The image forming apparatus 2 includes an authentication-transmitting unit 200.

The notification-event-setting unit 100 sets to send a notification of a error of server 1 as a recognizable event 310 to a non-registered user. The notification-event-setting unit 100 performs this setting in the event setting information 300.

In the case where an error actually occurs, the event-notifying unit 110 notifies about the event 310 set by the notification-event-setting unit 100.

The authenticating unit 140 performs authentication permission for using the image forming apparatus 2 according to user authentication information.

The notification-event-setting unit 100 sets to send a notification of an error of the server itself as a recognizable event 310 to non-registered user, who is not registered to perform authentication permission by the authenticating unit 140, in the event setting information 300.

Errors set by the notification-event-setting unit 100 may include a shortage of allocation area allocated for a job in the image forming apparatus, a user authentication permission error, and an execution error of a job caused by the control program of the server itself.

In the case where an error actually occurs, the event-notifying unit 110 notifies of the event 310 set by the notification-event-setting unit 100.

In the case where there is a notification of the event 310 by the event-notifying unit 110, the event-transmission-setting unit 120 performs a transmission setting for transmitting the notification to the non-registered user. For example, the event-transmission-setting unit 120 sets a setting to monitor the event 310 and notify the non-registered user of the event 310 in the transmission setting information 320.

The event-transmitting unit 130 actually transmits the event 310 notified by the event-notifying unit 110 to the non-registered user. The event-transmitting unit 130 may perform this transmission by e-mail or the like.

The authentication-transmitting unit 200 acquires the user authentication information from the operation-panel unit or the like. Then, the authentication-transmitting unit 200 transmits the acquired user authentication information to the server 1.

The event setting information 300 is an error setting for sending a notification of an error as a recognizable event 310 to a non-registered user. The event setting information 300 includes, for example, whether the notification is turned ON or OFF (Enabled), the identification name (Rule Name) of the event 310 to be notified of, the type of log (Type), the module of the authentication permission program for detecting errors (Subsystem), a transmission method to a non-registered user, and a keyword (Text). For example, in the case of the Windows (registered trademark) OS, the type of log can be set "Info", "Warning", "Error", "Notice", "Debug", or "Critical" corresponding to the type of error. In addition, the keyword may be a keyword indicating the type of error.

The event 310 is information indicating the operation result of the OS application or service, and is automatically collected as a function of the OS. The present embodiment illustrates an example of an "event" recorded (logged) so as to be viewable by the "Event Viewer" of the Windows (registered trademark) OS. In addition, the event 310 of the present embodiment includes an event related to shortage of allocation area allocated for a job in the image forming apparatus, error of user authentication permission, and job execution error caused by the control program of the apparatus itself.

The transmission setting information 320 is transmission setting information for transmitting to a non-registered user as an event 310. The transmission setting information 320 may be, for example, information about a task set in the task manager of the OS, and that monitors an event 310 and transmits e-mail or the like to a non-registered user.

The account settings 340 is a database in which a user ID, a password, and the like are set for performing authentication permission of an image forming apparatus 2 based on user authentication information. In addition, the account settings 340, for each user, may include information or the like about attributes of the user and groups to which the user belongs. As user attributes, for example, whether or not the user belongs to an organization that operates the image forming apparatus 2, the position of the user within the organization, authority of the user within the organization, and the like may be set. Incidentally, the account settings 340 may be settable by the user of the authentication permission program of the server 1 or an administrator (hereinafter referred to as "authentication permission administrator") that manages the program itself, or from an external higher-order server, or the like.

Here, by executing the control program stored in the storage unit 19, the control unit 10 of the server 1 functions as the notification-event-setting unit 100, the event-notifying unit 110, the event-transmission-setting unit 120, the event-transmitting unit 130, and the authenticating unit 140.

In addition, the control unit of the image forming apparatus 2, by executing the control program stored in the storage unit, functions as an authentication-transmitting unit 200.

In addition, each of the units of the server 1, the image forming apparatus 2, and the terminal 3 described above are hardware resources for executing the error notification method of the present disclosure.

It should be noted that a part of or an arbitrary combination of the above-described functional configurations may be configured as hardware such as an IC, programmable logic, FPGA (Field-Programmable Gate Array), and the like.

[Event Notification Transmission Process by the Server 1]

Figure 4:
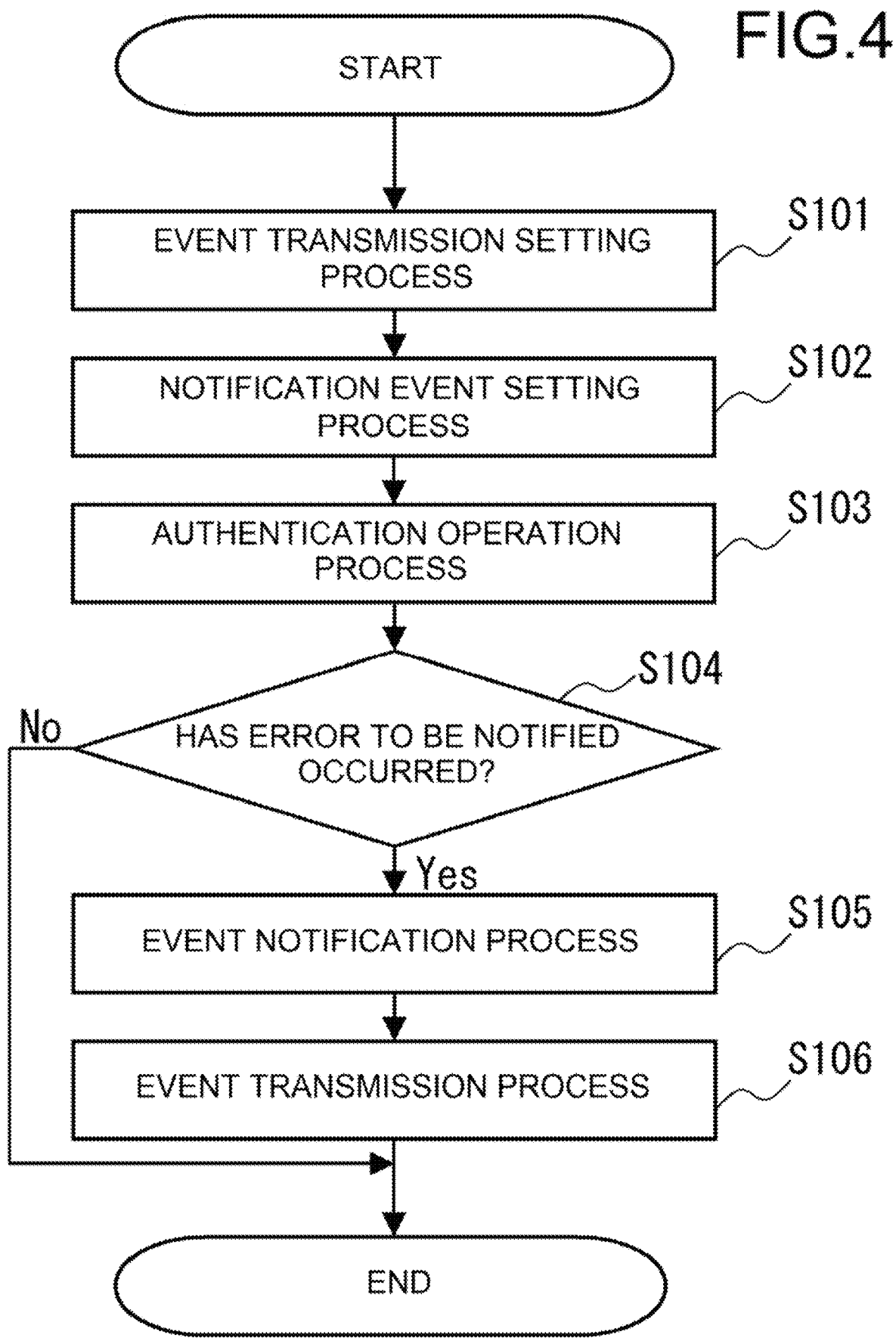
FIG. 4 is a flowchart of an error event notification transmission process of an embodiment according to the present disclosure.

Next, the event notification transmission process by the server 1 of an embodiment according to the present disclosure will be described with reference to FIG. 4 to FIG. 6.

The event notification transmission process of this embodiment performs a setting to send a notification of an error of the server 1 as a recognizable event 310 to a non-registered user. Then, when an error actually occurs, the event notification transmission process transmits a notification of the set event 310. The notification of this event 310 is transmitted to a non-registered user.

In the event notification transmission process of this embodiment, the control unit 10 of the server 1 cooperates with each unit and executes the control program stored in the storage unit 19 using the hardware resources.

The details of the event notification transmission process of this embodiment will be described step by step below with reference to the flowchart of FIG. 4.

(Step S101)

First, the event-transmission-setting unit 120 performs an event transmission setting process.

The event-transmission-setting unit 120 sets a transmission destination (hereinafter referred to as "address, or the like") of a non-authenticated user's e-mail or the like in the transmission setting information 320. For example, the event-transmission-setting unit 120 sets a task of monitoring an event 310 set by the notification-event-setting unit 100 and transmitting e-mail or the like to an address or the like of a non-registered in the OS task manager as transmission-setting information 320.

For example, the event-transmission-setting unit 120 may acquire information about a non-registered user stored in the storage unit 19 and perform this setting.

(Step S102)

Next, the notification-event-setting unit 100 performs a notification event setting process.

The notification-event-setting unit 100 sets to send a notification of an error of the server 1 as a recognizable event 310 to a non-registered user, in the event setting information 300. For example, the notification-event-setting unit 100 may perform this setting according to an instruction from an authentication permission administrator of the server 1, a higher-order server, or the like.

Figure 5A:
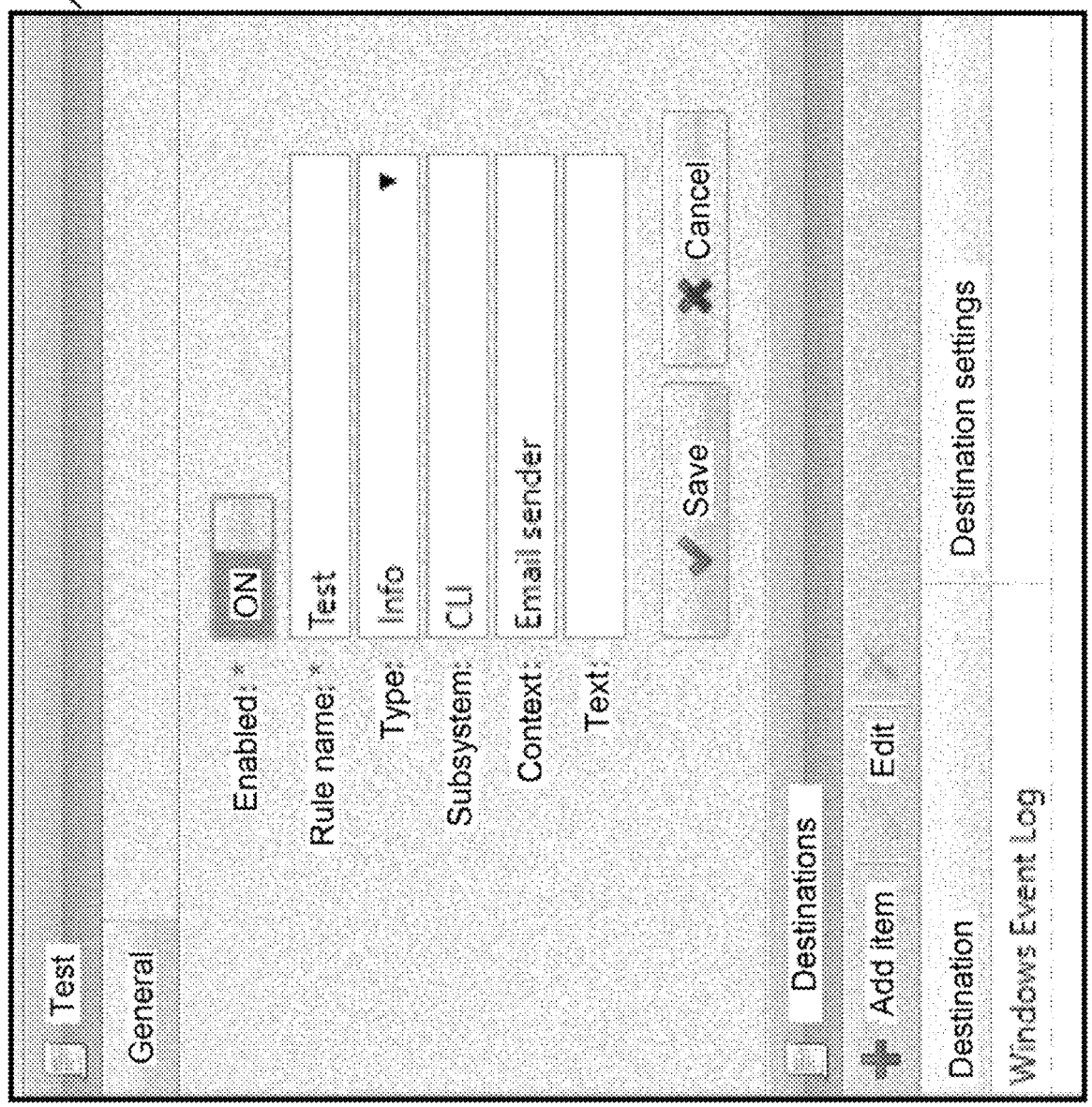
FIG. 5A is a conceptual diagram illustrating an example of event setting information of an embodiment according to the present disclosure.

FIG. 5A illustrates an example where the notification-event-setting unit 100 sets the notification (Enabled) of the event 310 to "ON", sets the identification name (Rule Name) of the event 310 to be notified of as "Test", the type of log as "Info", the module (Subsystem) as "CLI", the transmission method to non-registered users as "E-mail (Email sender)", and the keyword (Text) as "No setting (transmit all errors of module in question)". In the case of "no setting", the type of error is displayed on the character string notified in the event 310.

Figure 5B:
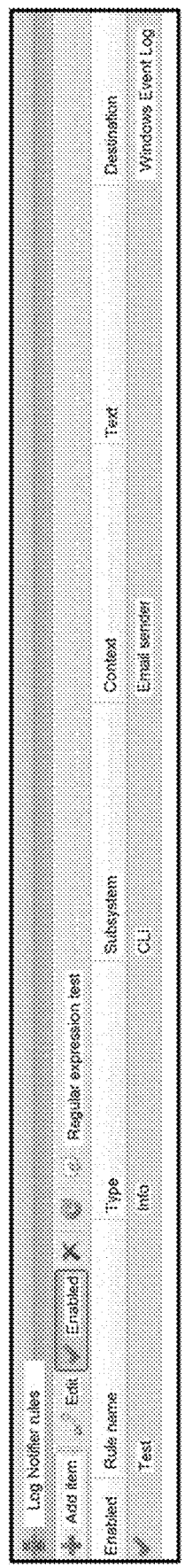
FIG. 5B is a conceptual diagram illustrating an example of event setting information of an embodiment according to the present disclosure.

In addition, as illustrated in FIG. 5B, it is also possible to check the "identification name of the event 310" in a list.

(Step S103)

Next, the authenticating unit 140 performs an authentication operation process.

Here, when a user uses the image forming apparatus 2, the authentication-transmitting unit 200 prompts the user to input authentication information such as by inputting the user ID and password by using the input unit of the operation panel unit, reading an ID card by using the card reader, inputting biometric information by using a biometric authenticating device or the like.

The authentication-transmitting unit 200 transmits the inputted user authentication information to the server 1.

The authenticating unit 140 that has acquired this authentication information refers to the account settings 340 and performs authentication.

As a result, a successfully authenticated user is allowed to normally use the image forming apparatus 2, and can use various functions, and execute pull printing and the like.
(Step S104)

Here, the event-notifying unit 110 determines whether or not an error to be notified has occurred.

The event-notifying unit 110 references the event setting information 300 and detects that a server 1 error to notify a non-registered user about has occurred. In the case where this error has occurred, the event-notifying unit 110 determines "YES". In other cases, the event-notifying unit 110 determines "NO".

In the case of YES, the event-notifying unit 110 advances the process to step S105.

In the case of NO, the event-notifying unit 110 terminates the event notification transmission process.
(Step S105)

In the case where an error to be notified about occurs, the event-notifying unit 110 performs an event notification process.

In the case of detecting that such an error has actually occurred, the event-notifying unit 110 notifies the OS of the event 310.

For example, the event-notifying unit 110 may perform a notification so that the event 310 is stored in the storage unit 19 as an OS log.
(Step S106)

Next, the event-transmitting unit 130 performs an event transmission process.

The event-transmitting unit 130 actually transmits the event 310 notified about by the event-notifying unit 110 and stored in the storage unit 19 to a non-registered user.

According to FIG. 6, for example, the event-transmitting unit 130 may execute a task of monitoring the event 310 set in the task manager of the OS and transmitting e-mail or the like to the address or the like of a non-registered user. In the example of FIG. 6, an example is illustrated in which a sentence similar to the content of the event 310 that can be browsed in the Windows (registered trademark) event viewer is transmitted by e-mail or the like.

This ends the event notification transmission process of this embodiment according to the present disclosure.

With the configuration described above, the following effects can be obtained.

In a typical image forming system, it is not possible to notify a non-registered user of the error status (status) regarding authentication permission.

On the other hand, the image forming system X of an embodiment according to the present disclosure includes an image forming apparatus 2 and a server 1 that performs authentication permission of a user using the image forming apparatus 2. The image forming apparatus 2 includes an authentication-transmitting unit 200 that transmits authentication information of a user to the server. The server 1 includes: an authenticating unit 140 for performing authentication permission according to user authentication information; a notification-event-setting unit 100 for setting to send a notification of a server error as a recognizable event 310 to a non-registered user, who is not registered to perform authentication permission by the authenticating unit 140; and an event-notifying unit 110 for notifying about the event 310 set by the notification-event-setting unit 100 when the error actually occurs.

With this kind of configuration, it is possible to notify a non-registered user who is not registered in the authentication authorization server 1 about the status of an error of the server 1. Therefore, it becomes possible, for example, to notify an IT administrator, SIer, or the like, and thus it is possible to reduce the time and labor required for server 1 management and support, and it is possible to reduce the support cost.

In addition, the server 1 of an embodiment according to the present disclosure further includes an event-transmission-setting unit 120 that performs a transmission setting for transmitting a notification to a non-registered user in the case where there is a notification about the event 310 by the event-notifying unit 110.

With this kind of configuration, even when the authentication permission administrator does not manually set a setting file or the like, by setting the file by the event-transmission-setting unit 120, it becomes possible to easily notify about an event 310 by transmitting e-mail or the like to a non-registered user.

Moreover, in the server 1 of an embodiment according to the present disclosure, the error is an shortage of allocation area allocated for a job in the image forming apparatus, a user authentication permission error, and an execution error of a job caused by the control program of the server itself.

With this kind of configuration, using an event 310, it becomes possible to notify about the state of an error that needs to be managed and supported by a non-registered user. Therefore, it is possible to reduce the time and labor required for managing and supporting the server 1. In addition, the time and labor required by an authentication permission administrator and user are reduced.

Other Embodiments

In the above-described embodiment, an example in which an event is directly transmitted to a non-registered user by e-mail or the like is described. However, the event notified about does not need to be transmitted. In this case, it is preferable that the notified event be saved in a state such that the event can be viewed with an event viewer or the like.

With this kind of configuration, even in the case where a non-registered user cannot receive an e-mail or the like, it is possible to know the contents of the error by accessing the server 1 and browsing the event.

Configuration is also possible in which even though an event is not set by the task manager and transmitted, the event may be transmitted by another program or the like.

Moreover, the above-described embodiment describes that the event setting information 300 and the transmission setting information 320 are to be set by the authentication permission administrator.

However, configuration can be such that from the terminal 3, a non-registered user himself/herself can respectively set the event setting information 300 and transmission setting information 320 via the notification-event-setting unit 100 and event-transmission-setting unit 120.

With this kind of configuration, even when the non-registered user to be notified of an event is changed or the like, the user who took over can set, and the time and labor required for of managing and supporting the server 1 can be reduced.

Furthermore, in the above-described embodiment, an example is described in which the event 310 is set for the event viewer of the Windows (registered trademark) OS and transmitted to a non-registered user. However, even in the case where the OS of the server 1 is another server OS, it is possible to cope with that OS using the same configuration. For example, the OS of the server 1 may be a *NIX type OS including a Linux (registered trademark), a POSIX (Portable operating system interface) interface, a real-time OS, or the like. In addition, the OS may be executed by a virtual machine (Virtual Machine) or the like.

Here, when the OS of the server 1 is an *NIX type OS, it is possible to transmit to a non-registered user in a similar way using cron and inter-process communication or the like.

Conventionally, maintenance management of hardware and software of a server that performs authentication permission has been performed by an IT (Information Technology) administrator, SIer (System Integrator), and the like.

However, since these persons are not directly related to the authentication permission of an image forming apparatus, they have not been registered as users of an image forming system (such persons are referred to as "non-registered users"). In such a case, it is impossible for the server to grasp on-line when a server problem (error) occurred due to the authentication permission program or the like. Therefore, the user himself/herself, by telephone, has to perform verbal contact or the like to inform the non-registered user about the trouble. In other words, even when an error occurs, it is not possible to notify a non-registered user directly from the server.

In addition, the typical technique described above is a technique for notifying about the log of an image, and it is difficult for those skilled in the art to directly apply the technique to an image forming system.

According to the present disclosure, by using a configuration in which it is set to send a notification of a server error as a recognizable event to a non-registered user, and the non-registered user is notified about the set event in the case where the error actual occurs, it is possible to provide a server that can directly notify a non-registered user of an error.

In addition, the technique according to the present disclosure can also be applied to information processing apparatuses other than an image forming apparatus. In other words, a configuration is also possible that uses a server 1 or the like to which a network scanner, scanner or the like is connected separately by a USB or the like.

Moreover, it is needless to say that the configuration and operation of the above-described embodiments are examples and can be appropriately changed and executed within a range that does not depart from the gist of the present disclosure.

What is claimed is:

1. A server for performing authentication permission of a user that uses an image forming apparatus connected to the server via network, comprising
    a storage unit on which a control program, a database, event setting information, and transmission setting information are stored; and
    a control unit that executes the control program, wherein
    the database comprises account settings of registered users permitted to authenticate to the image forming apparatus;
    the event setting information includes a setting for defining an event to be recognized by the control unit, wherein the event is a server error;
    the transmission setting information includes a destination other than one of said registered users; and
    the control unit is configured for
    creating the setting in the event setting information;
    referencing the event setting information to determine whether the server error has actually occurred;
    creating a notification about the event when the server error actually occurs; and
    transmitting the notification to the destination via a network.

2. The server according to claim 1, wherein
    the error includes
    an shortage of allocation area allocated for a job in the image forming apparatus, a user authentication permission error, and an execution error of a job caused by the control program of the server itself.

3. An image forming system comprising an image forming apparatus and a server connected via a network, wherein the server performs authentication permission of a user who uses the image forming apparatus, and wherein
    the image forming apparatus comprises:
    an authentication-transmitting unit that transmits authentication information of the user to the server;
    the server comprises:
    a storage unit on which a control program, a database, event setting information, and transmission setting information are stored; and
    a control unit that executes the control program;
    the database comprises account settings of registered users permitted to authenticate to the image forming apparatus, wherein the registered users comprise the user;
    the event setting information includes a setting for defining an event to be recognized by the control unit, wherein the event is a server error; and
    the transmission setting information includes a destination other than one of said registered users; and
    the control unit is configured for
    performing the authentication permission according to the authentication information of the user;
    creating the setting in the event setting information;
    referencing the event setting information to determine whether the server error has actually occurred;
    creating a notification about the event when the server error actually occurs; and
    transmitting the notification to the destination via a network.

* * * * *